United States Patent [19]

Dorff et al.

[11] Patent Number: 5,751,845
[45] Date of Patent: May 12, 1998

[54] METHOD FOR GENERATING SMOOTH COLOR CORRECTIONS IN A COLOR SPACE, PARTICULARLY A CIELAB COLOR SPACE

[75] Inventors: Peter Dorff, Moerfelden-Walldorf; Joern Kowalewski, Preetz; Sigrid Anni Lore Doehler, Karlsruhe; Uwe-Jens Krabbenhoeft, Landwehr, all of Germany

[73] Assignee: Linotype Hell AG, Kiel, Germany

[21] Appl. No.: 728,034

[22] Filed: Oct. 9, 1996

Related U.S. Application Data

[63] Continuation of Ser. No. 224,587, Apr. 7, 1994, abandoned.

[30] Foreign Application Priority Data

Apr. 8, 1993 [DE] Germany .................. 43 11 612.4
Dec. 18, 1993 [DE] Germany .................. 43 43 362.6

[51] Int. Cl.$^6$ .................................. G06K 9/66
[52] U.S. Cl. .................. 382/162; 382/167; 358/518; 358/531
[58] Field of Search .................. 382/162, 167; 358/518, 520, 531

[56] References Cited

U.S. PATENT DOCUMENTS

| | | | |
|---|---|---|---|
| 4,476,487 | 10/1984 | Klie et al. | 358/531 |
| 4,488,245 | 12/1984 | Dalke et al. | 358/520 |
| 4,602,294 | 7/1986 | Yamada | 358/531 |
| 4,745,465 | 5/1988 | Kwon | 358/80 |
| 4,812,903 | 3/1989 | Wagensonner et al. | 358/80 |
| 4,887,151 | 12/1989 | Wataya | 358/80 |
| 5,200,817 | 4/1993 | Birnbaum | 358/80 |
| 5,222,154 | 6/1993 | Graham et al. | 382/17 |
| 5,335,097 | 8/1994 | Murakami | 358/518 |

FOREIGN PATENT DOCUMENTS

| | | | |
|---|---|---|---|
| 0 457 427 A2 | 11/1991 | European Pat. Off. | H04N 1/46 |
| 31 10 517 C2 | 10/1983 | Germany | G03F 3/08 |
| 30 03 607 C2 | 1/1984 | Germany | G01J 3/50 |
| 31 10 222 C2 | 6/1985 | Germany | G03F 3/08 |
| 30 24 126 C3 | 7/1987 | Germany | H04N 1/40 |
| 41 04 467 A1 | 8/1992 | Germany | H04N 1/40 |
| 1 595 122 | 8/1981 | United Kingdom | H04N 1/40 |

*Primary Examiner*—Leo Boudreau
*Assistant Examiner*—Chris Kelley
*Attorney, Agent, or Firm*—Hill & Simpson

[57] ABSTRACT

Method for generating harmonic color corrections in a color image. The color image is deposited in an image store and is displayed on a monitor. Color samples of the colors that are to be subjected to a selective color correction are taken from the image with a coordinate input means. Color correction values that act on the colors defined by the color samples are input. In order to obtain harmonic transitions at the locations in the image where the selected colors meet non-selected, neighboring colors, the color correction decreases toward the edges of the color correction area. This is achieved by a filtering of the color samples or color correction values. A color computer calculates the corresponding color correction values.

28 Claims, 16 Drawing Sheets

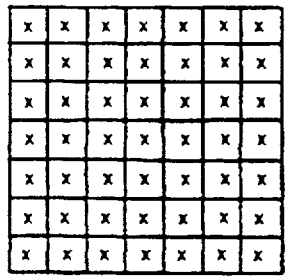
1. PLANE
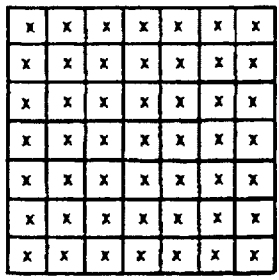
2. PLANE
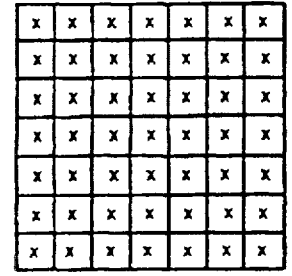
3. PLANE
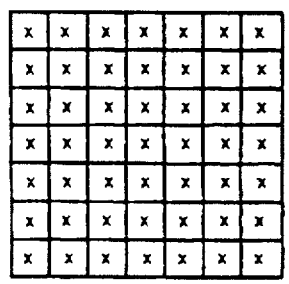
4. PLANE
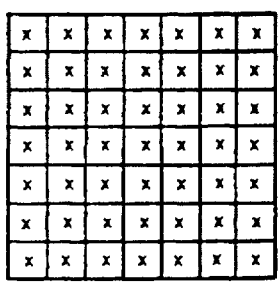
5. PLANE
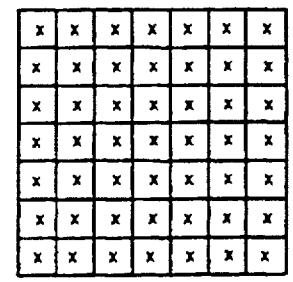
6. PLANE
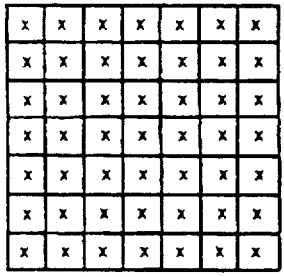
7. PLANE
Fig. 8a

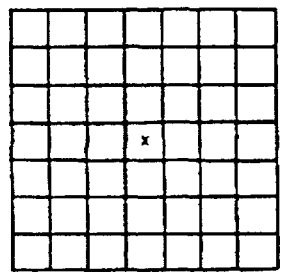
1. PLANE
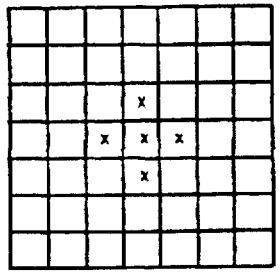
2. PLANE
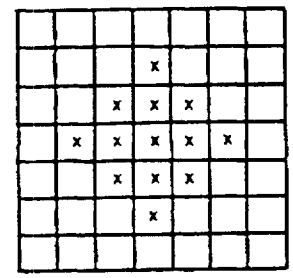
3. PLANE
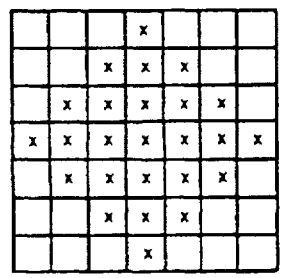
4. PLANE
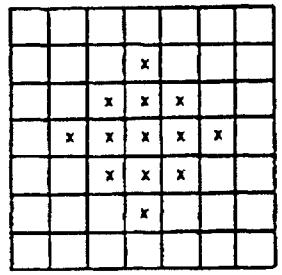
5. PLANE
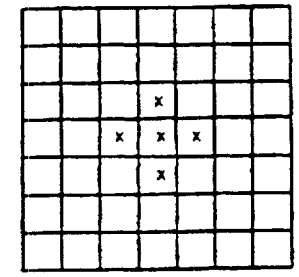
6. PLANE
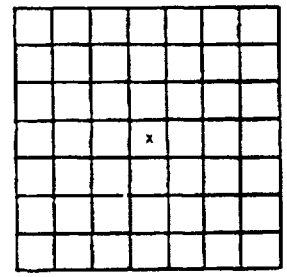
7. PLANE
Fig. 8b

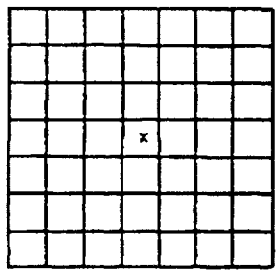
1. PLANE
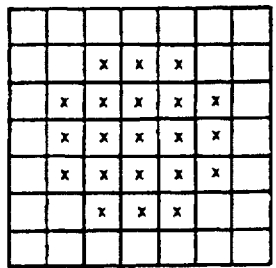
2. PLANE
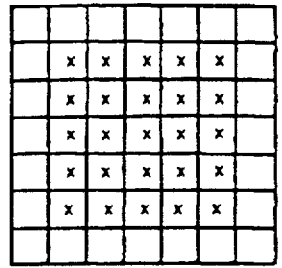
3. PLANE
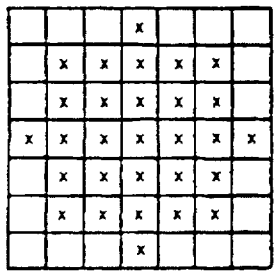
4. PLANE
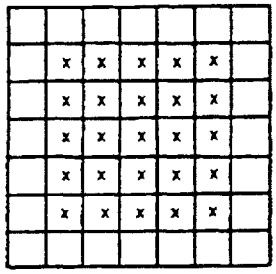
5. PLANE
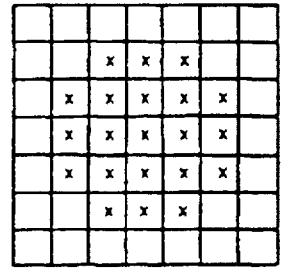
6. PLANE
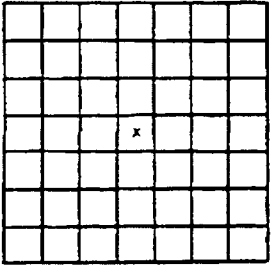
7. PLANE
Fig. 8c

| +2 | +6 | +8 | +6 | +2 | | |
|----|----|----|----|----|----|----|
| +6 | +17 | +21 | +13 | +4 | | |
| +8 | +21 | +19 | +4 | -4 | -1 | |
| +6 | +13 | +7 | -9 | -13 | -6 | -1 |
| +2 | +4 | -1 | -11 | -14 | -9 | -3 |
| | | -1 | -4 | -5 | -4 | -1 | a*

Fig. 12c

METHOD FOR GENERATING SMOOTH COLOR CORRECTIONS IN A COLOR SPACE, PARTICULARLY A CIELAB COLOR SPACE

This is a continuation of application Ser. No. 08/224,587, filed Apr. 7, 1994 now abandoned.

RELATED APPLICATIONS

The present application is related to the following two copending applications: Peter Dorff et al application entitled "METHOD FOR GENERATING UNIFORM COLOR AREA DEFINITIONS WITH ADDITION AND REMOVAL OPERATORS", Hill Firm Case No. P-94,0784; and Uwe-Jens Krabbenhoeft application entitled "METHOD FOR GENERATING GEOMETRIC MASKS WITH A DIGITAL COLOR COMPUTER", Hill Firm Case No. P-94,0786.

BACKGROUND OF THE INVENTION

The invention is directed to a method and to an arrangement for selective and smoothing color retouch. Published application GB 2117902 already discloses a system for selective color correction and color recognition. Here, an operator can move a cursor back and forth on a color image that is displayed on a monitor. For correcting a specific color of the image, the cursor is brought to a picture element that corresponds to the color to be corrected and the corresponding color coordinates or color values are stored. In order to reduce errors in the color selection, picture elements from the environment of the selected picture element are also taken into consideration. Further, samples are also taken in the dark and in the bright region of the color in order to also take dark and bright regions of the color into consideration in the color correction. The result may be seen in FIG. 1. Here, the colors are presented in the LAB color space. Analogous to the luminance of the samples that have been taken, a plurality of planes result in the L* axis where the individual samples are contained. The centroid of the samples is now calculated for each of these planes, and the points acquired in this way are connected to form a curve I. In order to also allow color deviations from the curve I, color values are also taken into consideration that lie at a defined distance or in a defined tolerance region from the curve I. The result is a 3-dimensional color space that contains the color to be corrected. Colors that lie outside the color space are not corrected. The disadvantage of this method is that the color space is designed rotationally-symmetrically relative to the curve I, that an arbitrary shaping of a color correction area is thus not possible, and that colors that should actually also be corrected are thereby not covered. One solution of this problem is to enlarge the tolerance area; this, however, leads to the fact that colors at other locations in the color space that are not to be corrected are then also covered. The color spaces that have arisen then define the colors in the image that are to be corrected. In order to obtain smooth transitions, a color correction decreases toward the edge of the color space. This is achieved by a weighting function W that allows a maximum color correction for colors that lie on the curve I of the color correction space and that decreases with the distance r from the curve I. For example, the weighting function can be a Gauss function in three dimensions.

Letters Patent EP 004078 likewise discloses a selective color correction method. A color that is to be corrected is freely prescribed. In a 3-dimensional color space, this color occupies a dot, or it can be described by a vector from the origin of the color coordinate system to the dot. The selective color correction then decreases the further the color is located from the point of this vector (FIG. 2). Dependent on the color coordinate system employed, a sphere or a cube derives as a color correction space. Color correction then no longer occurs at the edges of the color correction space and the color merges smoothly or harmoniously into the surrounding, neighboring color. The employment of a sphere as a color correction area results given employment of a polar coordinate system for the color coordinates. A cube with sides parallel to the axis of the color space is preferably employed as a color correction area for a Cartesian coordinate system.

U.S. Pat. No. 5,130,789 employs an ellipse as a color correction area. The "target color" is taken from the image, this lying in the center of the ellipse. The major axis of the ellipse coincides here with the saturation of the axis of the "target color" in the color coordinate system. The "target color" is then converted within input color correction values into a "destination color." The color correction likewise decreases toward the edges of the color correction space.

All of the afore-mentioned, selective color corrections proceed on the basis of a point of a curve in the color space from which the color correction symmetrically decreases according to a previously defined function. An arbitrary shaping of the color correction in the color space is thereby not possible. Given various color corrections in the color space, no mutual influencing of the color corrections occurs given the methods applied in the prior art. This can lead to color breaks in the image when two colors near the color space lie in close proximity, but belong to different color correction spaces, and when different or opposite color correction values are input for the two color correction spaces.

SUMMARY OF THE INVENTION

It is an object of the present invention to solve the above problems and to provide a simplified method for color selection in selective color retouch, whereby arbitrarily shaped color spaces can be produced that contain all colors to be corrected.

According to the method of the invention, smooth color corrections are generated in a stored color image. A color sample memory stores selected color samples P that have been taken from a stored color image with a coordinate input unit. The input possibility of color correction values K is defined by an area of the color sample spaces and decreases smoothly toward the edges of the color sample spaces, so that a smooth transition to non-selected neighboring colors results. A color computer provides for color correction of color values of the stored color image. The colored samples form arbitrarily shaped color sample spaces. The color samples are subjected to a filtering that produces a weighting of the color samples so that a smooth transition to non-selected locations in the color space is produced at the transitions of the color sample spaces which avoids undesired color breaks of the color correction. The weighted color samples in the color sample spaces are employed with the color correction values for the color correction of the stored color image.

BRIEF DESCRIPTION OF THE DRAWINGS

FIG. 8a shows a cuboid filter form;

FIG. 8b shows a double-conical filter form;

FIG. 8c shows a spherical filter form;

FIG. 10e shows normed, weighted color samples;

FIG. 12a shows color corrections;

FIG. 12b shows weighted color corrections; and

FIG. 12c illustrates normed, weighted color samples.

DESCRIPTION OF THE PREFERRED EMBODIMENTS

A preferred embodiment of the invention shall be described first in the following specification. It is assumed in the preferred embodiment of the invention that an image is digitally stored in the CIELAB color space (see DIN 5033). This color space is formed of a luminance axis $L^*$ of a red/green axis $a^*$ and of a yellow/blue axis $b^*$. It is constructed approximately in conformity with sensation corresponding to the color sensation of man. The CIELAB color space makes it possible to exchange color data independently of apparatus and system. The image data are calculated by opto-electronic scanning of the originals with scanners known in reproduction and by subsequent analog-to-digital conversion of the image signals acquired in the scanning.

Figure 1:
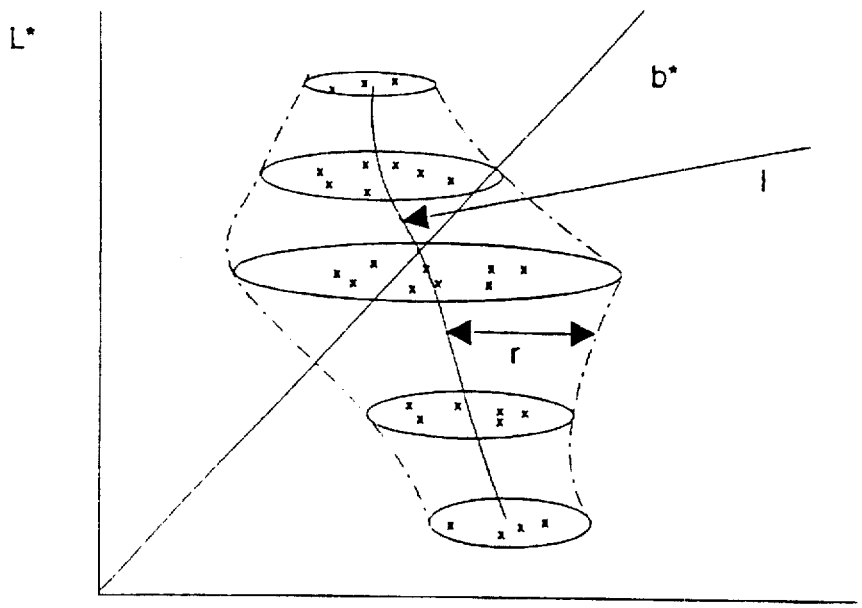
FIG. 1 is a LAB color space having a generated color sub-space (prior art).
Figure 2:
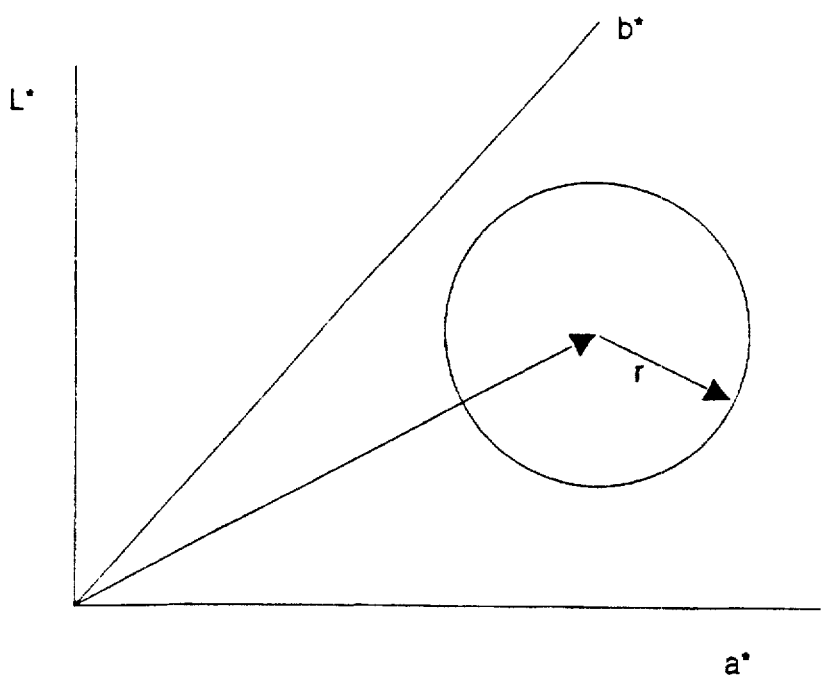
FIG. 2 is a spherical color correction space (prior art)
Figure 3:
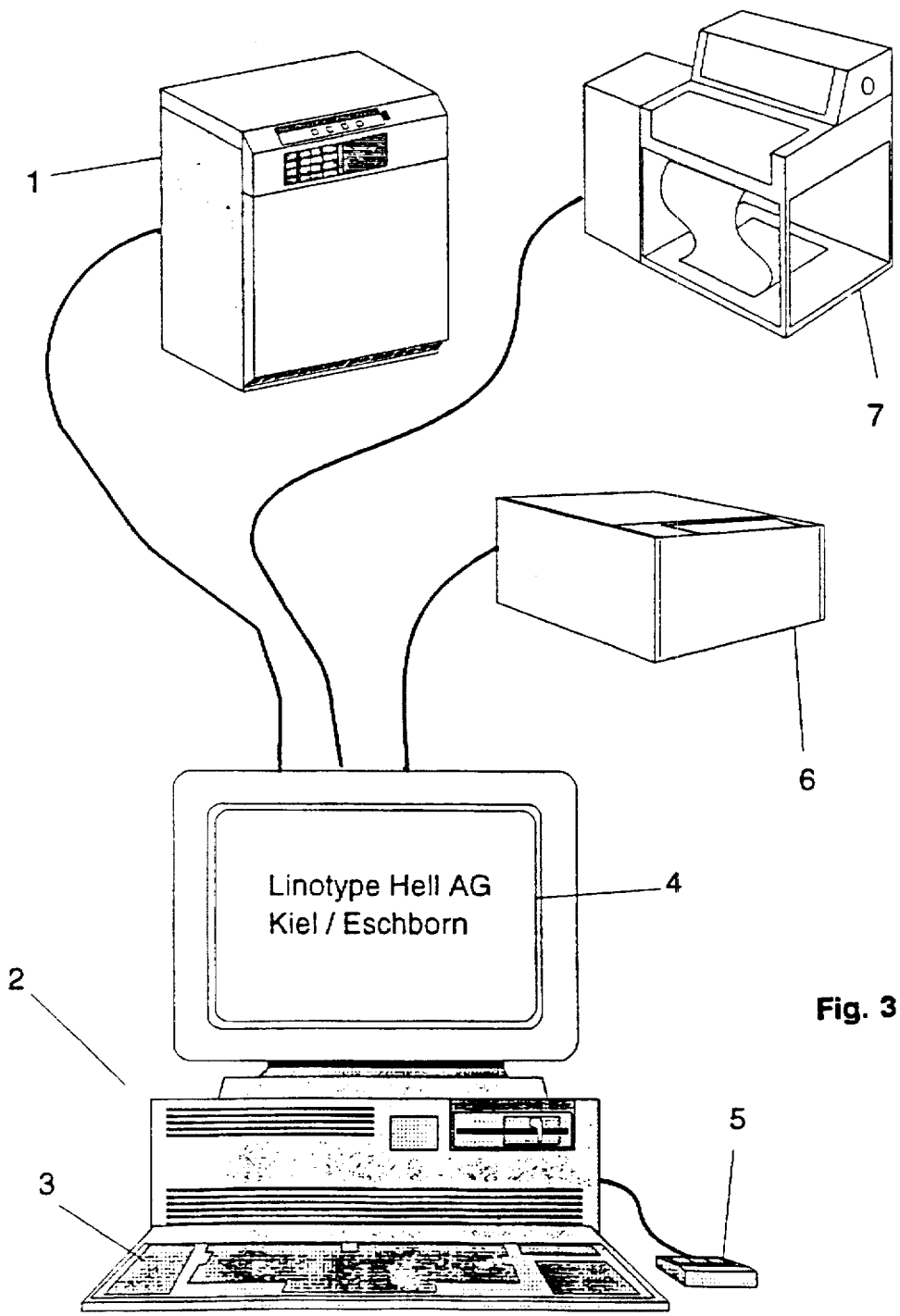
FIG. 3 is a general overview of a system employed in the invention.

FIG. 3 shows a general overview of the system employed in the preferred embodiment. A scanner (for example, Chromagraph S 2000 of Linotype-Hell AG, Kiel, Germany) for scanning originals is referenced 1, this supplying image data in digital form to a work station 2 (for example, Apple McIntosh of Apple, Inc., Calif., U.S.A.) that is provided with a keyboard 3 for input of data and with a monitor 4 for displaying data. A mouse 5 is present for inputting picture screen coordinates; this, however, can also be replaced by a xy-tablet, by a track ball, by a joystick, or by a similar coordinate input means. For faster processing of color image data, a color computer 6 (CTU Color Transformation Unit of Linotype-Hell AG) is connected to the work station 2, this color computer 6 undertaking the necessary calculations. The color computer can also be implemented by a corresponding program or software, i.e. upon employment of a correspondingly programmed computer. The processing of the color data then occurs correspondingly slower. For output of color separations, an output means 7 (for example, a recorder chromagraph R 3020 of Linotype-Hell AG) is present, completely processed color separations being capable of being output therewith.

Figure 4:
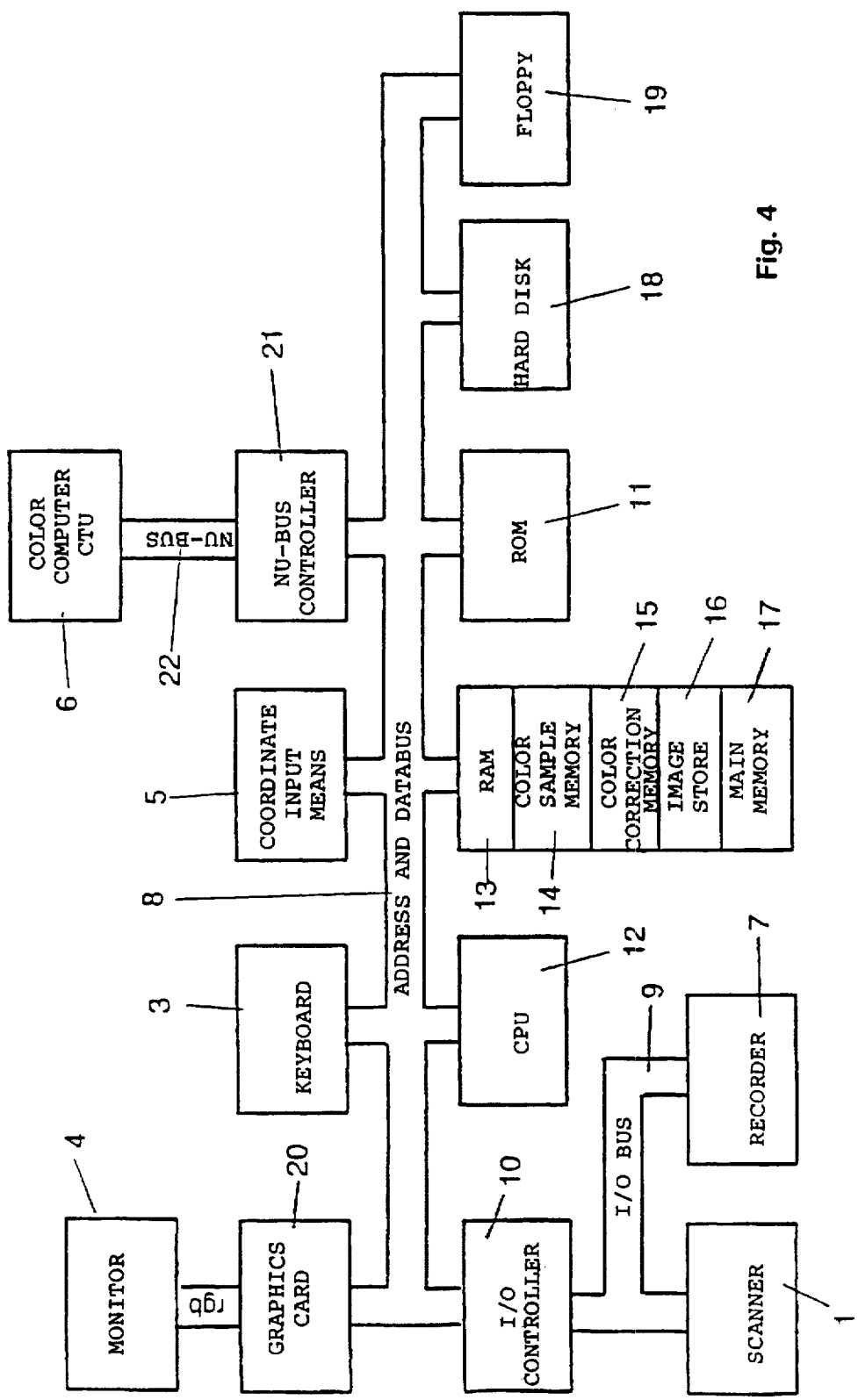
FIG. 4 is a block diagram of the system employed in the invention.

The block diagram in FIG. 4 provides an overview of the signal flow within the system. All components of the work station 2 are connected to one another via an internal bus 8. The data from the originals scanner 1 proceed via the I/O bus 9 and the I/O controller 10 onto the internal bus 8 and are then deposited in the RAM 13 or on the hard disc 18. The I/O controller 10 controls the data flow of the external input and output devices with the internal system. Other input and output devices in addition to the originals scanner 1 and the recorder 7 can also be connected to the work station 2 such as, for example, a photo CD tape drive that supplies data in the YCC format, a flat-bed scanner, a laser printer, etc. The program necessary for the operation of the CPU 12 is stored in the ROM 11. The RAM 13 is subdivided into a plurality of areas for storing various data, for example image data and data that are necessary for the operation of the system. One area of the RAM 13 is used as a memory for color samples or as a color sample memory 14. The color sample memory 14 in the RAM 13 is organized such that the $L^*a^*b^*$ color values can address a location in the color sample memory 14. Another area of the RAM 13 serves the purpose of storing color correction values in the color space or as a color correction memory 15. The image to be processed is deposited in the image store 16. Intermediate results of calculations and other data are intermediately stored in the main memory 17. The overall functions of the system are controlled by the CPU 12. Image data files and other data can be stored on a hard disc 18 and on the floppy 19. The monitor 4 serves the purpose of displaying image data and other data, and has its own graphics card 20 with a picture screen memory for a faster output of image data. The keyboard 3 serves the purpose of inputting commands to the CPU 12 and other data. For faster color correction of color image data, a color computer 6 is connected via a NU bus controller 21 and via the NU bus 22. The detailed description thereof follows later.

In the preferred embodiment, the image data are processed in the CIELAB format. Data that are supplied from an input device in a different format first pass through a conversion process, so that they are internally present in the CIELAB format. The conversion of the various formats can be automated in that a list having input and output devices is prepared, this then allocating the devices having the formats to the individual I/O ports.

Upon start up of the system, a main program is first started and all system components are initialized. Variables are set to a standard value. A user surface for operating and controlling the system and the individual components is constructed on the monitor 4. The user surface contains a plurality of picture screen windows for displaying various information and color images and a plurality of pull-down menus for setting and inputting other functions and data.

Figure 5:
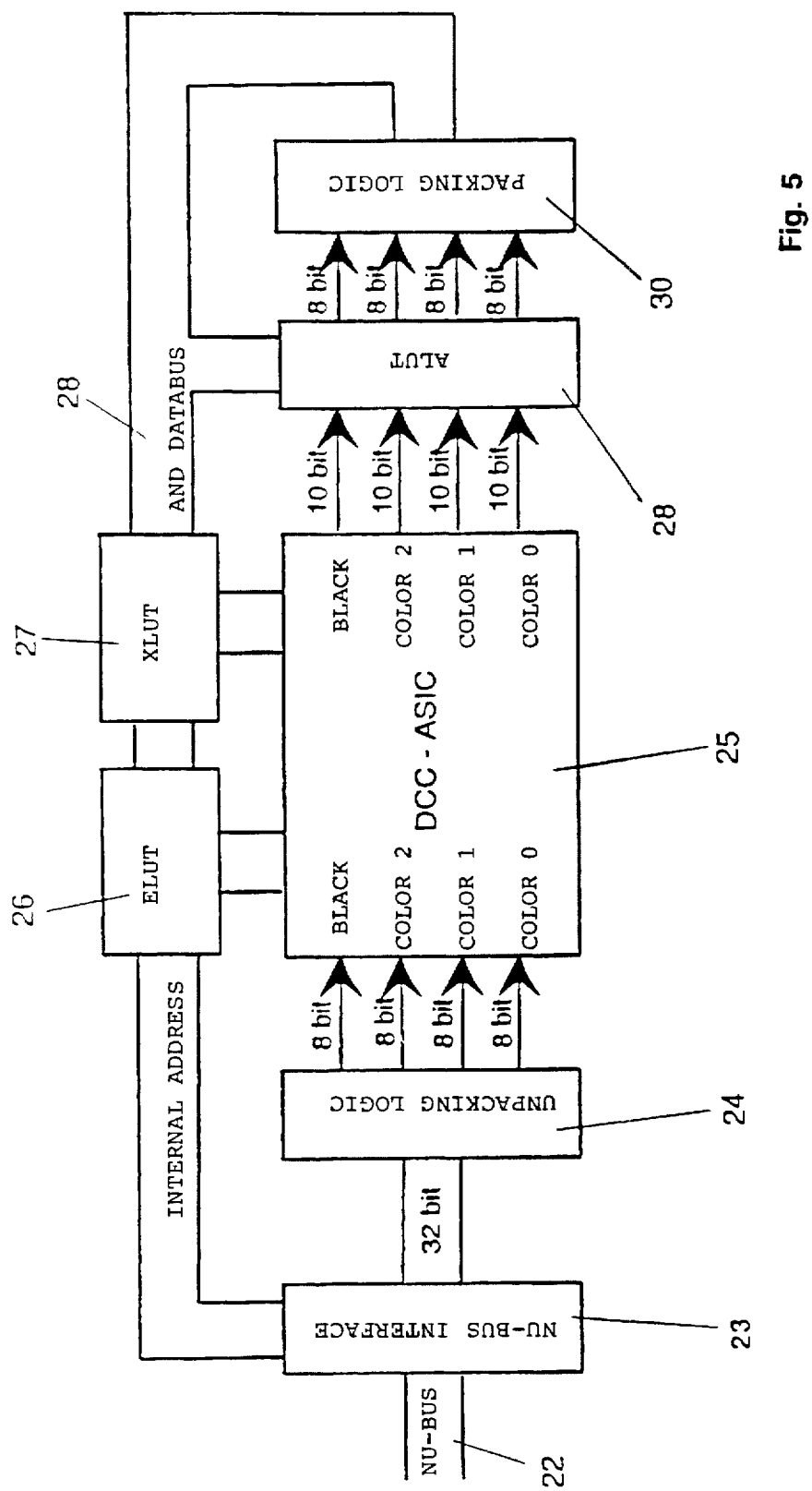
FIG. 5 is a block diagram of a color computer (CTU) employed in the invention.

The color computer in FIG. 5 communicates via the NU bus 22 with the work station 2. The color image data are first sorted by the unpacking logic 24 according to a prescribed format and are then supplied to a block referenced DCC-Asic 25. The DCC-Asic 25 (digital color conversion) is composed of a specific circuit that undertakes an interpolation of color data, and of a NU bus interface 23 for controlling the data flow. An input table ELUT 26 initially converts the 8-bit color data into 10-bit values. The necessary color correction is then undertaken with the XLUT 27. For that purpose, the five most significant bits of the color data address a corresponding location in the XLUT 27. An interpolation of the output values is then undertaken in the DCC-Asic 25 with the five least significant bits of the color data and with the values from the XLUT 27. The DCC-Asic is responsible for the actual calculating procedure of the color conversion. The 3-dimensional interpolation of a color dot is implemented according to the principle of tetrahedron interpolation (see DE-C-2813519) with the four corner points V0 through V3 of the tetrahedron surrounding the dot. These four corner points are successively read out from the XLUT 27 by the DCC-Asic, and are subsequently weighted and added up. This occurs in parallel for all three or four colors to be converted (inputs black, color 0, color 1, color 2 of the DCC-Asic). The output values calculated in this way can be forwarded in parametered fashion directly onto the outputs (black, color 0, color 1, color 2) of the Asic or can be previously multiplicatively operated with the black value. The addresses for reading the tetrahedron corner points V0 . . . V3 from the XLUT 27 are acquired by the DCC-Asic 25 from the five most significant bits of the color inputs. The output values are supplied to an output table ALUT 28 that undertakes a conversion from the 10-bit format into an 8-bit format. A packing logic 30 sorts the output color data according to a desired format. The color image data are then supplied via the internal address and data bus 29 and via the NU bus 22 to the work station 2, and can be correspondingly further processed and stored. Desired fillings are read into the ELUT 26, XLUT 27, and ALUT 28 via the internal data and address bus 29.

For a fine-area correction, a color image is first loaded into the image store 16 from the input device 1, from the hard disc 18 or from the floppy 19. Since work is preferably carried out in the CIELAB format, the color data are correspondingly converted when they are not present in the CIELAB format. For that purpose, the tables of the ELUT 26, XLUT 27, and ALUT 28 are provided with a corresponding filling. The CPU then reads the original image data, which are not established in the CIELAB format, from the image store 16 and forwards them via the NU bus 22 to the input of the color computer. The converted data can then be taken at the output of the packing logic 30 via the bus 29 and via the NU bus interface 23, and can be deposited in the image store 16. Data that are supplied by an input device in a different format initially pass through this conversion process, so that they are internally present in the CIELAB format.

On the basis of a plurality of different conversion processes, the system can process arbitrarily input formats such as, for example, RGB or YCC. Television signals or video signals according to various standards such as, for example, NTSC, PAL, SECAM, HD-Mac, and MPEG 2 can also be processed.

Assuming that the data files generated by scanners or by other application programs are present in the TIFF or PICT data file format, they can also be read in and converted into the CIELAB format.

Just like the implementation of a conversion of various input formats at the input side, a conversion into a desired output format of the image data such as, for example, CMYK (cyan, magenta, yellow, black) or RGB (red, green, blue) is possible at the output side. The conversions of the various formats can occur on the basis of a plurality of sub-programs that are stored on the hard disc 18, on the floppy disc 19, or in the ROM 11, and that are executed by the CPU 12 after the I/O controller 10 has written new image data into the RAM 13, or after data from the RAM 13 are output to an output device via the I/O controller 10. The CPU 12 then calls a specific conversion program for the corresponding data conversion that brings the data into the necessary format.

Likewise, a conversion from CIELAB to the RGB format and back is undertaken in order to display the image on the monitor 4. For that purpose, the image store of the graphics card 20 is loaded with the RGB image data. The image can then be displayed in an image window in the picture screen. A plurality of image windows can be present for a fine-area correction in order to display the original and the manipulated color image side-by-side. The monitor should be calibrated for a true-to-color reproduction of the colors.

For a fine-area correction, the color sample memory 14 is erased, since a "0" is written into all memory cells of the color sample memory. For taking color samples with a coordinate input means 5, the CPU 12 first reads the input coordinates on the image window that have been specified with the coordinate input means 5, for example a mouse in this case, and then reads the corresponding color values from the image store 16 of the RAM 13. The conversion of cursor coordinates into addresses for memories is disclosed by patent application WO 80/02612 (Preuss et al.) of Linotype-Hell AG. The corresponding location and the color sample memory 14 is then set via the bus 8. For that purpose, the color data L*a*b* of the image picture sought with the coordinate input means 5 addresses a corresponding location in the color sample memory 14, which is then set. For that purpose, a "1" can be written into the corresponding memory cell.

After color samples have been taken from an image with the coordinate input means 5, the color sample memory 14 contains a corresponding plurality of color samples. The color samples can be subjected to a filtering with the CPU 12. For that purpose, the CPU 12 reads the color data from the color sample memory and implements a corresponding filter program that is stored in the ROM 11, on the hard disc 18, or on the floppy 19. Intermediate results are stored in the main memory area of the RAM 17.

After the filtering has been ended, the color sample memory 14 is rewritten with the filtered values. A copy of the original color samples can be deposited in the main memory 17.

Figure 6:
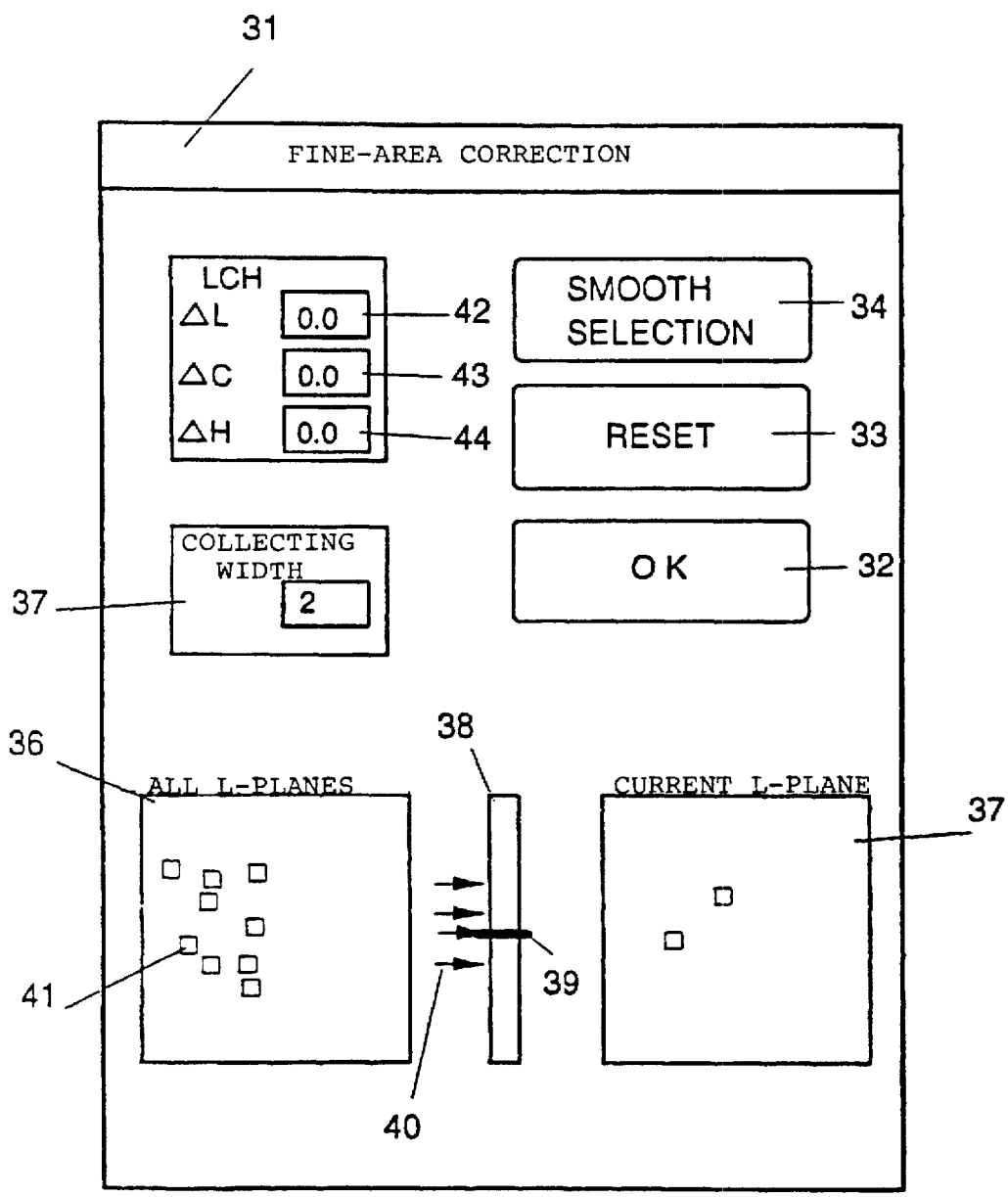
FIG. 6 is a picture screen display related to the fine-area correction.

A selective color correction of color areas can be undertaken with the dialogue window 31 (fine-area correction), as may be seen in FIG. 6. The color sample memory 14 is erased by clicking with the mouse 5 into the input field "reset" 33 and the collecting width for color samples in the color space is set to the value "2". As a result thereof, only the points that have the same classification are selected in the CIELAB color space. Subsequent settings for the collection width are possible; they refer to the colors in the CIELAB color space:

0=select individual dot

1=selected dot plus the dot lying thereabove and therebelow in luminance

2=selected dot plus all directly neighboring dots

3=selected dot plus the dots spherically located therearound—the radius of this sphere is thereby equal to 2

4=selected dot plus the dots spherically located therearound—the radius of this sphere is thereby equal to 3 etc., until 15=selected dot plus the dots spherically located therearound—the radius of this sphere is thereby equal to 14

These values can be input into the input field "collecting width" 37 by the operator with the keyboard 3. The standard value of "2" is set for the fine-area correction as long as the operator does not input a different value.

The operator now collects new color samples from the color image to be corrected, this being displayed on the monitor 4. For that purpose, the cursor is moved with the coordinate input means 5, a mouse in this case, into a region of the image whose color is to be modified. This, for example, can be a skin color or an especially pale color in the image. After the cursor has been moved to the desired color pixel, a sample having the corresponding color is taken from the image by clicking with the left-hand mouse key, and the corresponding L*a*b* color values address the corresponding memory cell and the color sample memory 14, this now being set ("1"=sample taken). In order to avoid errors in the selection of the color pixels, pixels in the proximity of the pixel that has been clicked onto can also be taken and can be deposited in the color sample memory. For example, pixels that lie within a 3×3 matrix around the selected pixel in the image can also be taken into consideration. The step of taking color samples can now be repeated a few times until an adequate number of color samples of the color has been selected. The color sample memory 14 thus also accepts dark or bright regions of the color or of the transitions of the color in the region to a different color into the color sample memory 14.

The color coordinates in the selected color samples in the CIELAB color space are displayed in the dialogue window 31 on the luminance axis L* and in the color selection, or respectively, a*b* plane. The LAB color space seen from above is displayed in the left-hand color selection 36, i.e. all samples 41 are displayed regardless of their L* value. In the right-hand color selection 37, only the color samples in the current L* plane that were set by the slide 39 are displayed. The axis in the middle 38 indicates the L* axis. By displacing the slide 39, a current luminance plane can be selected; and the operator can view the a*b* values on the right-hand color selection 37. The markings 40 identify L* planes wherein samples have been taken.

Figure 7:
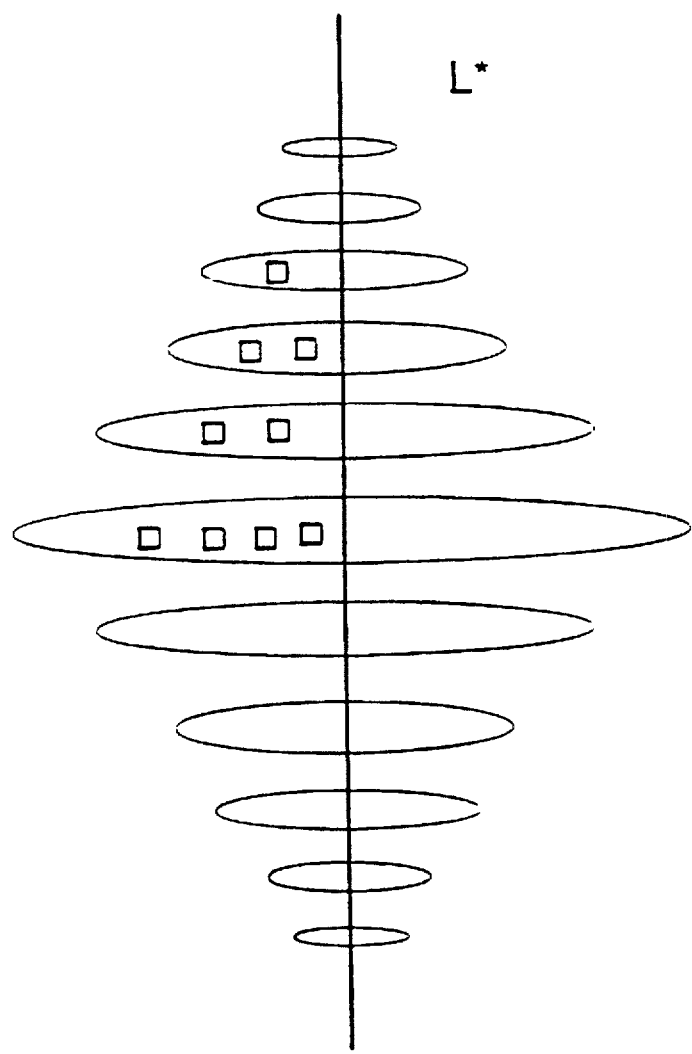
FIG. 7 shows collected color samples.

In a color space shown in simplified fashion, FIG. 7 shows different luminance levels wherein the color samples have been taken.

When the operator is not satisfied with the current color sample selection, further color samples can be subsequently collected. Samples in the color selection can also be directly set in that the operator clicks onto the corresponding location in the color selection 36 or color selection 37 with the mouse.

The color samples taken from the image form an irregular collection of points, what is referred to as a "cloud", in the CIELAB color space. Dependent on how many and on how many different colors have been taken from the image, a plurality of clouds can also have arisen. As a rule, however, the individual clouds comprise unoccupied locations in the color space or in the color sample memory. Further, potentially singular points in the color space are occupied. When a color correction is now calculated with this cloud, then one does not obtain a smooth behavior of the color correction; for example, discontinuities in the colors can occur. Undesired, singular points are erased and gaps in the clouds are filled by clicking into the input field 34 "SMOOTH SELECTION" (see German patent application filed 8 Apr. 1993, "Stuetzstellenkorrektus", DE-A4311611.6 of Linotype-Hell AG). The color sample spaces that have arisen in this way can be employed for selective color correction. The displays 36 and 37 are correspondingly updated and the current color samples are displayed. Given a satisfactory selection, the color correction values are input next. The input occurs as a Δ value into the input fields 42, 43, 44. The values by which the selected color area are to be corrected are input here, i.e., are to be shifted in a color space. The middle points of the area are then modified by the values that have been set. In order to assure smooth color transitions, the correction decreases in the direction toward the outer points in the color sample space. The input of the color correction values preferably occurs in the LCH color system, which is equivalent to the CIELAB system. The realized user surface LCH creates the setting values for the luminance (L), chrominance (chroma c), and for the hue (H) from the CIELAB color space (luminance L=L, chrominance $C=\sqrt{a^{*2}+b^{*2}}$, hue H=arctan (b*/a*)). The colors can thus be corrected in conformity with sensation according to luminance, chrominance and hue. The value range for the luminance L extends from 0 for absolute black up to 100 for reference white. All grey scale tones free of chrominance are located between 0 and 100. Setting possibilities from 0 to 100 also expediently form the basis for the chrominance. The position of the hue is defined in the color circle in degrees. Accordingly, settings from 0 through 360 are possible for the hue H. The original color image and the corrected color image can now be displayed side-by-side on a monitor 4 and can be displayed without the dialogue window 31; or only the correct color image is displayed, dependent on the operator's option. When the color correction is not satisfactory, the color correction values can be modified. The fine-area correction is ended by clicking into the input field 32 "ok".

The color correction values are now added up to the colors that have been defined by the selected color samples in the color sample spaces that have arisen. When the color correction values act identically on all color samples, i.e. when the color correction values are added to all selective colors equally weighted, then color breaks to the neighboring colors result at the edges of the color sample spaces. The color samples at the edges of the color correction area are therefore lent a weighting so that the color correction values at the edges of the color correction region are added up correspondingly smaller.

In order to achieve smooth transitions between selected and non-selected locations in the color sample space, the color sample spaces are digitally filtered according to convolution algebraic rules. As a result thereof and by contrast to the prior art, arbitrary paths derive at the edges of the color correction areas. The gradient area and the gradient behavior are defined by the order and by the form of the filters. These filters are n-dimensional (n=3, 4 . . . ). The dimension is dependent on the color coordinate system employed. The filter form is based on the underlying distance criteria $L_1$ (double cone), and $L_2$ (spherical) through $L\infty$ (cuboid).

The distance criteria are defined in the following way. When $P(x_1, x_2 \ldots x_n)$ and $Q(y_1, y_2, \ldots y_n)$ are two points of the n-dimensional space $R^n$, then the number d (P, Q) is called the distance between P and Q. The various distances are defined by the following equations:

$$d(P, Q) = \sum_{T=1}^{n} |x_i - y_i|$$

The $L_1$ distance between P and Q, $$d(P, Q) = \sqrt{\sum_{T=1}^{n} (x_i - y_i)^2}$$

The $L_2$ distance or euclidean distance between P and Q.

$$d(P, Q) = \max|x_i - y_i|$$
$$i = 1, \ldots, n$$

The $L\infty$ distance between P and Q.

With these distances, the form of the filter limited here to three dimensions, is determined in the following way.

Let P (x, y, z) be the central point of the 3-dimensional filter window; what is then value for the weighting matrix A={a (i, j, k)} of the filter employed is $$a(i, j, k) = \begin{cases} 0 \text{ when } d[P(x, y, z), Q(x+i, y+j, z+k)] > d_{fixed} \\ \neq 0 \text{ when } d[P(x, y, z), Q(x+i, y+j, z+k)] \leq d_{fixed} \end{cases}$$

When the filter window has the dimensions $(2l+1) \times (2m+1) \times (2n+1)$, then what is valid for $d_{fixed}$ is $d_{fixed}=l=m=n$.

Examples of this for a 3-dimensional filter having $ld_{fixed}=m=n=3$ are shown in FIG. 8. FIG. 8a shows a cuboid weighting matrix A having a $L\infty$ distance. The crosses thereby identify the form of the filter. FIG. 8b shows a double-conical weighting matrix A having a distance $L_1$; FIG. 8c shows a spherical weighting matrix A having a distance $L_2$. Other forms, of course, are possible. The filter coefficients and the filter form can be arbitrarily selected according to the desired gradient. The calculated gradient is either directly interpreted as the mask or is allocated as a weighting to color corrections of image pixels.

Two different embodiments of the invention having a cuboid weighting matrix A shall be described below. The distance here is $L\infty$. For achieving the operation, the weighted sum of each dot and its proximity is calculated as in a 3-dimensional, digital filtering (see Anil K. Jain, "Fundamentals of Digital Image Processing", Prentiss Hall International Editions, pages 244–245, 1989, expanded here to three dimensions):

P (x, y, z) value of the dot at the location x, y, z;

W a suitable window with the dimensions (2l+1) or (2m+1), (2n+1);

a (i, j, k) weighting matrix.

A sum S is formed and this is normed later with the values of the weighting matrix G.

$$S(x, y, z) = \sum_i \sum_j \sum_k a(i, j, k) P(x+i, y+j, y+k)$$

with $$-l \leq i \leq +l$$
$$-m \leq j \leq +m$$
$$-n \leq k \leq +n$$

and $$G = \sum_i \sum_j \sum_k a(i, j, k) \text{ sum of the weighting matrix}$$

$S^*(x, y, z) = S(x, y, z)/G$ thus follows.

Figure 9A:
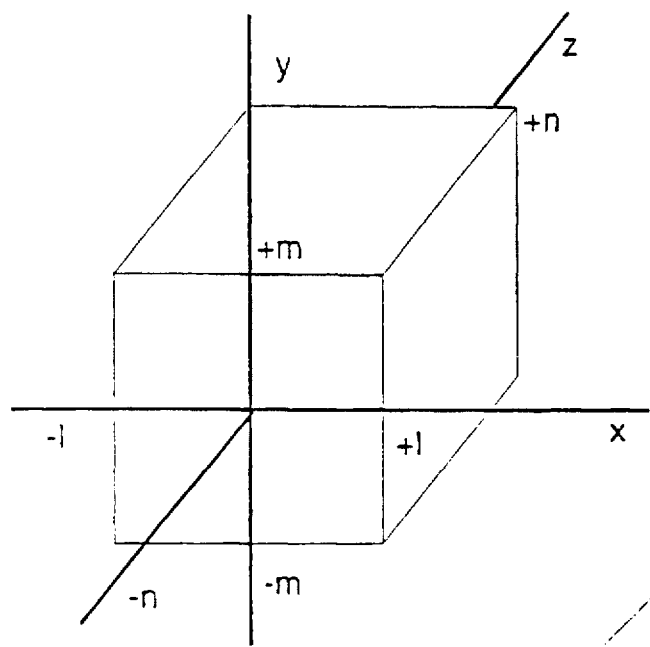
FIG. 9a illustrates an example of a window employed in the invention.
Figure 9B:
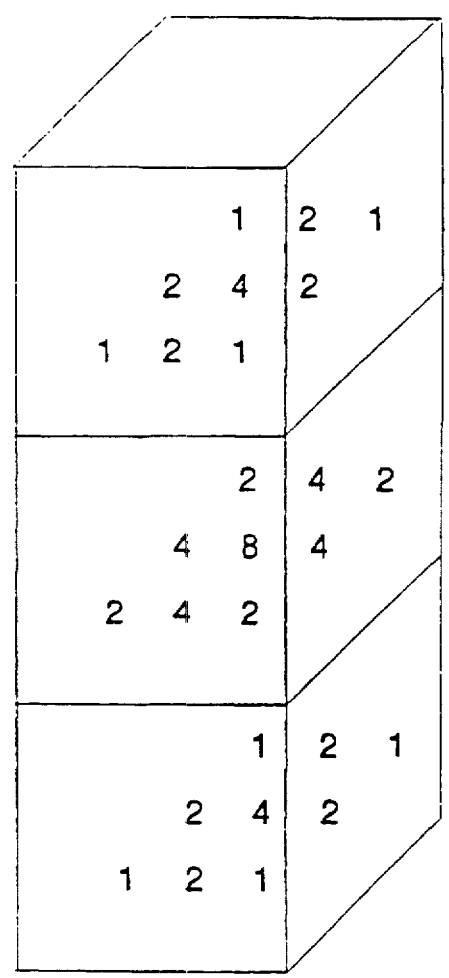
FIG. 9b is an example of a weighting matrix.

FIG. 9 shows an example of a fitter window W (FIG. 9a) and of a weighting matrix a (i, j, k) (FIG. 9b). Here, the filter window has the dimensions 3×3×3; the i, j, k consequently run from 1,0, to +1, i.e. $i\epsilon\{-1,0,1\}$, $j\epsilon\{-1,0,1\}$, $k\epsilon\{-1,0,1\}$ and, thus l=m=n=1 applies.

Coming into consideration for the application of the filtering are either the color samples in the color correction sample memory having the values 0 or 1 or the color correction values themselves.

First, the application of the filtering to the color samples in the color sample memory shall be set forth for the first embodiment of the invention. Given employment of a CIELAB color space, the following equations result for the filtering, with:

P (L*, a*, b*) color sample at the location L*, a*, b* in the color space or color sample memory—value 0 or 1 a(i, j, k) suitable weighting matrix for weighting the color samples

W a suitable window, having the three dimensions (2l+1), (2m+1), (2n+1).

Deriving for a dot at the location L*a*b* in the color space for the sum S(L*,a*,b*) is $$S(L^*, a^*, b^*) = \sum_i \sum_j \sum_k a(i, j, k) P(L^*+i, a^*+j, b^*+k)$$

with the values for i, j, k that are defined by the size of the filter window $$-l \leq i \leq +l$$
$$-m \leq j \leq +m$$
$$-n \leq k \leq +m$$

The sum S (L*, a*, b*) is then correspondingly normed to the sum of the coefficients of the weighting matrix $$S^*(L^*, a^*, b^*) = S(L^*, a^*, b^*)/G$$

with $$G = \sum_i \sum_j \sum_k a(i, j, k) \text{ sum of the weighting matrix}$$

The color sample memory 14 is then written with new values according to the weighting of the individual color samples. The color samples thereby define the area of the colors in the image that are shifted in the color space corresponding to the values ΔL42, ΔC43, ΔH44 input into the dialogue window 31 "fine-area correction." Then deriving for the new color values of a dot F (L*, a*, b*) in the image is with $$F^*(L^*, a^*, b^*) = F_{L^*}(L^*, a^*, b^*), F_{a^*}(L^*, a^*, b^*), F_{b^*}(L^*, a^*, b^*)\}$$

$$F^*(L^*, a^*, b^*) = F_{L^*}(L^*, a^*, b^*) + S^*\Delta L^*,$$
$$F_{a^*}(L^*, a^*, b^*) + S^*\Delta a^*,$$
$$F_{b^*}(L^*, a^*, b^*) + S^*\Delta b^*\}$$

Figures 10A, 10B:
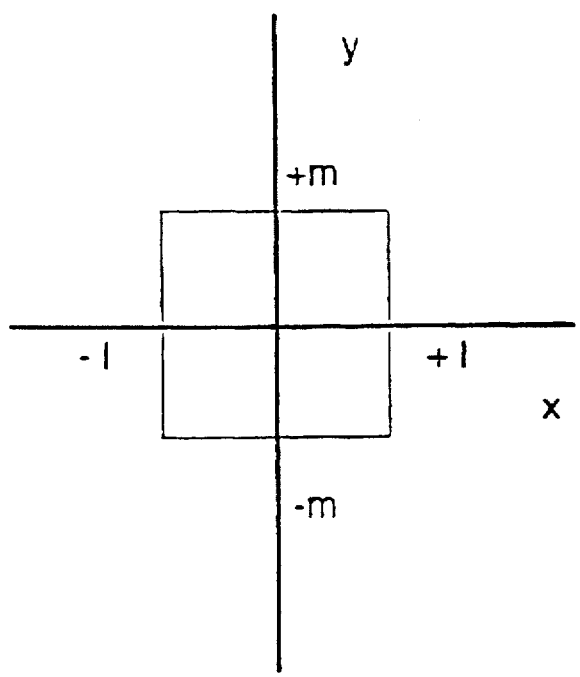
FIG. 10a is an example of a two-dimensional filter window.
FIG. 10b is an example of a weighting matrix employed in the invention.
Figure 10C:
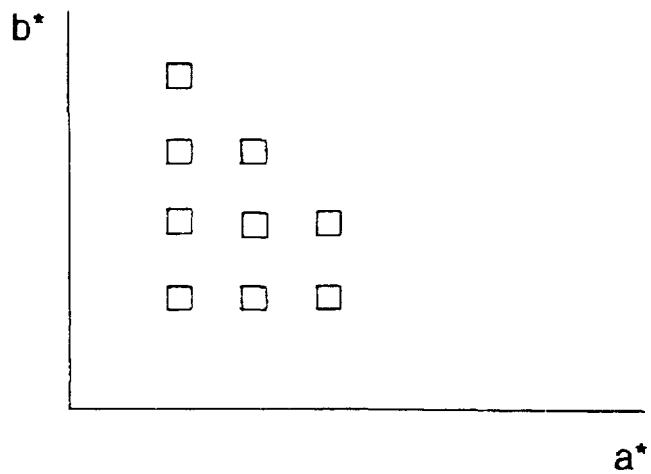
FIG. 10c shows collected color samples.
Figure 10D:
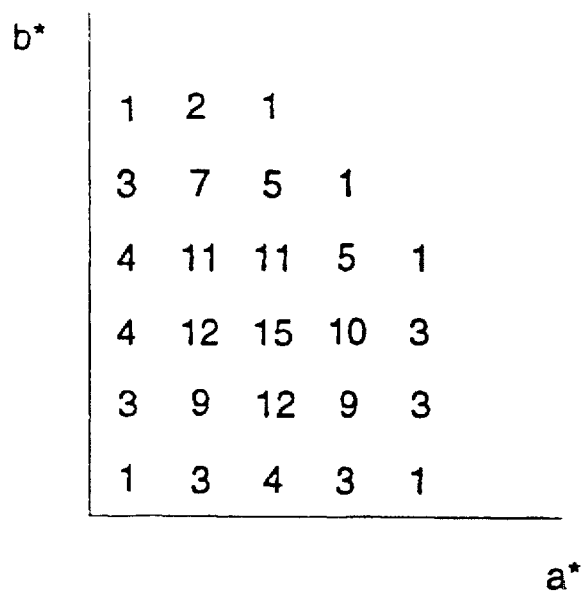
FIG. 10d shows weighted color samples.
Figure 10E:
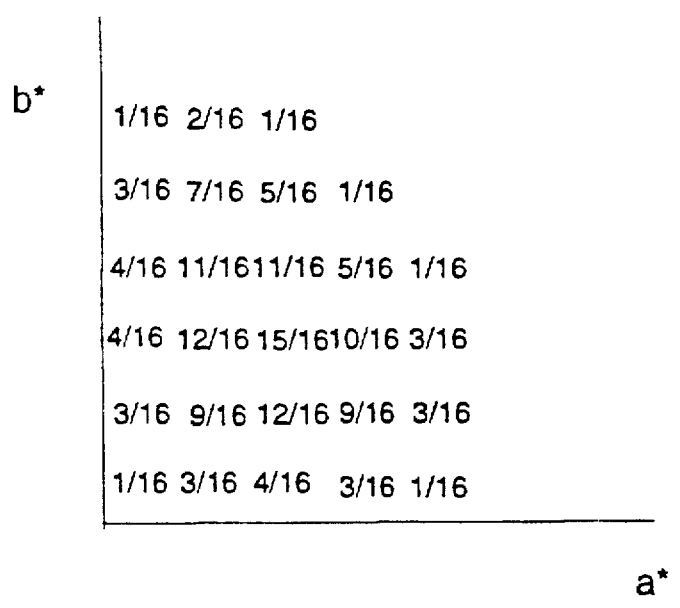

FIG. 10 shows an example of a filtering of color samples. For simplification, the example is limited to two dimensions. FIG. 10a shows a filter window employed and having the dimensions 3×3. FIG. 10b shows a weighting matrix a(i, j) therefor. FIG. 10c shows an excerpt from the color sample memory 14 in the a*b* plane. FIG. 10d shows the sum S (L*a*b*). FIG. 10e shows the weighted sum S*(L*,a*,b*). The color samples P(L*, a*, b*) having the values 0 or 1 are now replaced by the weighted sum S* (L*, a*, b*). A smooth gradient to locations in the color space that have not been occupied thus results at the edges of the correction areas.

Another possibility for generating the weighting can also be comprised in employing a different weighting matrix for each of the planes L*, a*, b*, so that three different, weighted sums $S_L^*$ (L*, a*, b*), $S_a^*$ (L*, a*, b*), $S_b^*$ (L*, a*, b*) result. For that purpose, the weighted sum must be formed three times.

Figure 11A:
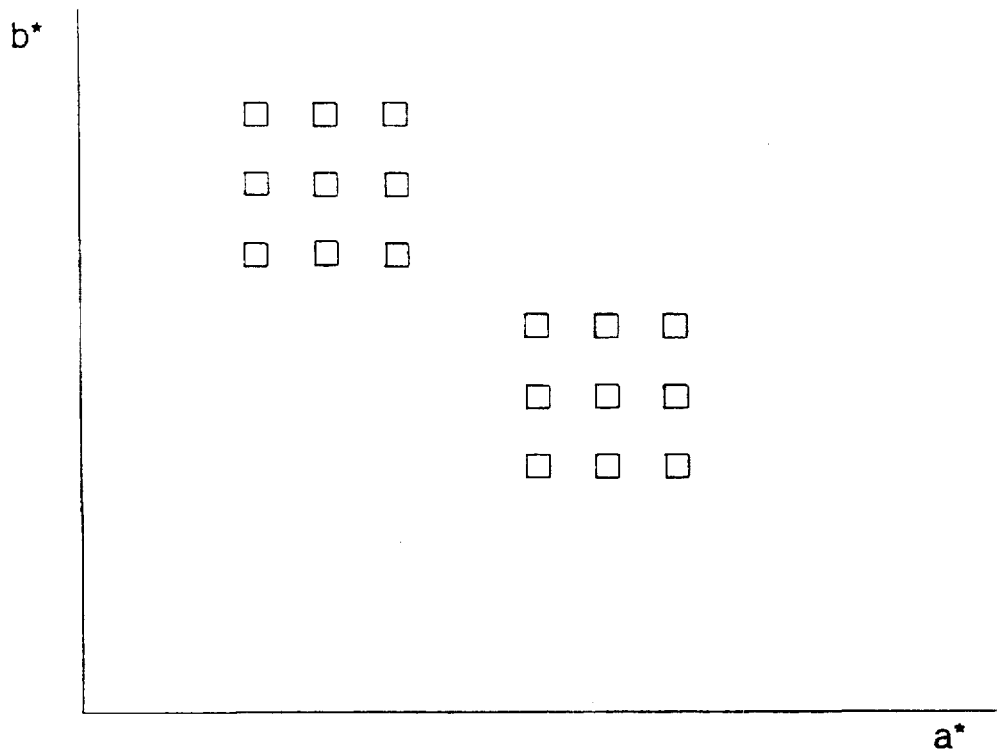
FIG. 11a shows collected color samples.
Figure 11B:
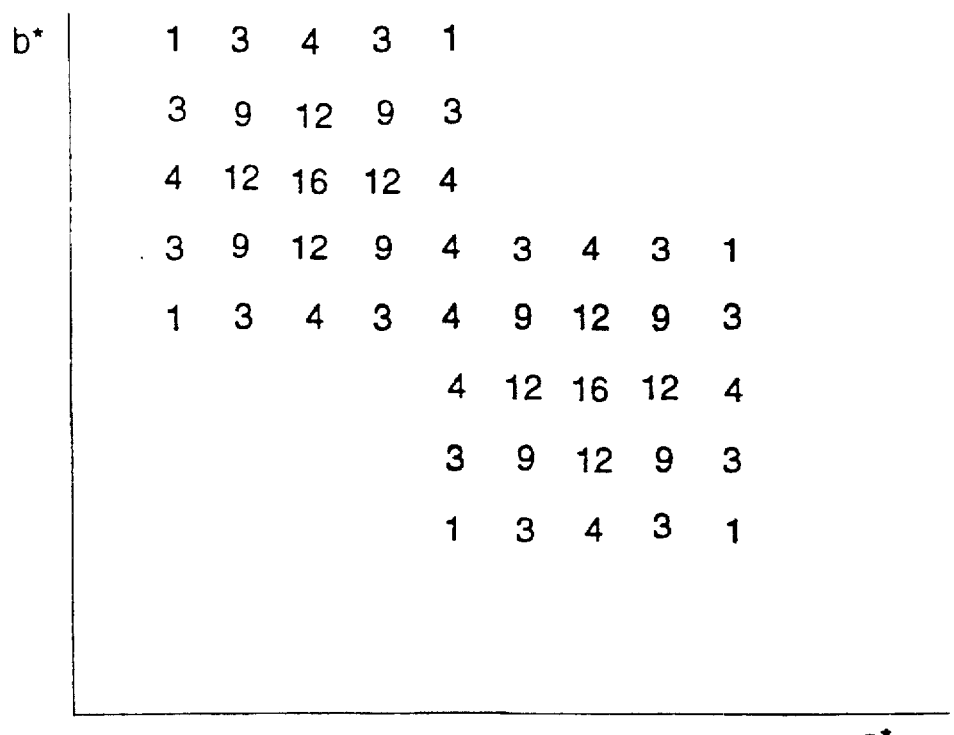
FIG. 11b shows weighted color samples.

Problems occur in this embodiment when different color samples have been taken from the image which lie relatively close to one another in the color space. This situation is shown in FIG. 11a. Two color sample spaces have been occupied. Only one plane is shown here. FIG. 11b shows the weighted sum. A mutual influencing of the two color sample spaces occurs at the locations where the two color sample spaces nearly mutually touch. If the operator now desires a different color correction for each of the two colors, then the weighted sums can no longer be unambiguously allocated to the color correction.

One solution lies in providing a separate area in the color sample memory for each color correction, so that the color samples of the color corrections are separately filtered. This leads to an increased memory and calculating expense. A solution of this problem is described in the second embodiment of the invention.

For the color correction, the color computer 6 is loaded with the resulting color correction values. The corresponding filling of the XLUT 27 at the locations defined by the color sample spaces is loaded with values modified according to the color correction values and according to the weighting S* (L*, a*, b*). For that purpose, the corresponding locations in the color sample memory 14 at which a color sample was set are converted into addresses for the XLUT 27 and the corresponding value is then written via the data bus 29 at the address location in the XLUT 27. A color correction for the image deposited in the memory 16 can now be calculated with the modified values in the XLUT 27. For that purpose, the image data is applied to the color computer 6 via the NU bus 22. The color-corrected value then appears at the output of the color computer, and this can again be deposited in the memory 16. The operator can view the color-corrected image on the monitor 4.

In a second embodiment of the invention, instead of the weighting of color samples, a direct weighting of the color correction values $\Delta L$, $\Delta C$, $\Delta H$ is undertaken. The corresponding values are written in the color correction memory 15 at the locations in the color space that are defined by the color samples P(L*, a*, b*) that have been taken or that are desired. The color correction values are input into the dialogue window 31 and are $\Delta$ values that can be positive or negative. Corresponding equations result:

K(L*, a*, b*) color correction values at the location L*, a*, b* in the color space, or respectively, color correction memory, whereby K(L*, a*, b*)={$K_L$*(L*, a*, b*), $K_a$*(L*, a*, b*), $K_b$*(L*, a*, b*)} correspond to the three correction values $\Delta 6L$, $\Delta C$, $\Delta H$ input into the dialogue window 31.

a(i, j, k) suitable weighting matrix for weighting the color correction values

W a suitable window, having the three dimensions (2l+1), (2m+1), (2n+1).

For a correction value at the location L*a*b* in the color space, the following derives for the sum S(L*, a*, b*):

$$S(L^*, a^*, b^*) = \sum_i \sum_j \sum_k a(i, j, k) K(L^* + i, a^* + j, b^* + k)$$

with the values for i, j, k defined by the size of the filter window $-l <= i <= +l$ $-m <= j <= +m$ $-n <= k <= +n$ The sum S (L*, a*, b*) is then correspondingly normed to the sum of the coefficients of the weighting matrix.

$$S^*(L^*, a^*, b^*) = S(L^*, a^*, b^*)/G$$

with $G = \sum_i \sum_j \sum_k a(i, j, k)$ sum of the weighting matrix

The sum must be formed for every color correction value, mainly respectively for L*, a*, b* according to the CIELAB color system employed. For the color correction values, $K^*(L^*, a^*, b^*) = S^*(L^*, a^*, b^*)$ then simply derives. Then following for the new color values of a dot F*(L*, a*, b*) in the image is:

$$F^*(L^*, a^*, b^*) = F_L*(L^*, a^*, b^*) + S^*_L*(L^*, a^*, b^*),$$
$$F_a*(L^*, a^*, b^*) + S^*_a*(L^*, a^*, b^*),$$
$$F_b*(L^*, a^*, b^*) + S^*_b*(L^*, a^*, b^*)\}$$

FIG. 12 shows an example of this, but limited for the sake of simplicity to two dimensions a*, b* given a fixed value for L*. Color samples have been taken at two locations in the image. Different color correction values were input for the two color sample spaces. Only one color correction value shall be considered here, for example $\Delta L$*. The same weighting matrix as in FIG. 10b and the same filter window as in FIG. 10a were employed. FIG. 12a shows the originally input color correction values $\Delta L$*. The luminance is boosted by +30 in the one area and is attenuated by −20 in the second area. The corresponding sum $S_L$*(L*, a*, b*) is shown in FIG. 12b. After the norming, FIG. 12c then results with the normed sum $S^*_L$*(L*, a*, b*). The values were rounded up or off. A smooth gradient to locations in the color space that were not occupied results due to the filtering. A mutual influencing of the color corrections occurs at the location where the two color correction areas nearly touch. A flattening of the color correction in areas where the two color correction areas touch occurs due to the filtering of the color correction values.

By contrast to the first embodiment, the filtered color correction values can be directly employed. The input of different color corrections is also possible without an additional color sample space having to be offered. A multiplication of the weighted sums by the color correction values is not required. Instead, three sums $S_L$*(L*, a*, b*), $S_b$*(L*, a*, b*), $S_a$*(L*, a*, b*) must be formed. A different weighting matrix or filter function can be employed for each of these sums.

Problems in the allocation of color corrections of various colors do not result since the color correction values are directly filtered. The color computer can be correspondingly loaded with the color correction values. The corresponding filling of the XLUT 27 is loaded for that purpose with the filtered color correction values at the locations defined by the color sample spaces. For that purpose, the corresponding locations in the color sample memory 14 at which a color sample was set are converted into addresses for the XLUT 27 and the corresponding value is then written via the data bus 29 at the address location in the XLUT, since the filtered color correction value can simply be added on. A color correction for the image deposited in the store 16 can now be calculated with the modified values in the XLUT. For that purpose, the image data are applied via the NU bus 22 to the color computer. The color-corrected value then appears at the output of the color computer 6, which can in turn be deposited in the memory. The operator can view the color-corrected image on the monitor.

Other embodiments will now be described.

The filtering in the preferred embodiment of the invention was described here on the basis of a weighted sum. The application of other filter functions, of course, is possible.

The color sample memory stores the color samples in a full resolution of 3×8 bits for the L*a*b* values. As a result thereof, the color sample memory becomes correspondingly large. In order to reduce the memory capacity, the color samples can also be deposited in a memory with a reduced resolution for the color coordinates. For that purpose, only supporting points having less of a quantization are used in the color space. The network of supporting points is constructed in the color space; intervening values can be interpolated. For this purpose, the most significant bits address the respective supporting point and the values lying therebetween are acquired by an interpolation.

In another embodiment of the invention, a CMYK color coordinate system is employed instead of a CIELAB color coordinate system. The color correction values are then correspondingly input as CMYK values. Of course, the employment of other color coordinate systems, for example RGB, XYZ, YIQ, or YCC, is also possible.

It is also possible to generate a geometric mask in the image, so that only colors that lie within the mask are corrected in the image. For that purpose, a spatial region in the image that is to be color-corrected can be traced with a cursor. This mask generating can then be linked with the present invention. Only the colors that lie within the geometric mask and that are defined by the color samples that have been taken are then corrected.

Although various minor changes and modifications might be suggested by those skilled in the art, it will be understood that we wish to include within the scope of the patent warranted hereon all such changes and modifications as reasonably come within our contribution to the art.

We claim as our invention:

1. A method for generating smooth color corrections in a stored color image, comprising the steps of:

collecting color samples P having locus coordinates and color values from the stored color image with a coordinate input unit;

providing a color sample memory for storing the color values of these color samples P;

providing a color computer for color correction of color values of the stored color image;

forming an arbitrarily shaped color sample space from the color values of the color samples;

before utilizing the color values of the color sample space for correction, subjecting the color values of the color sample space to a filtering with a convolution function employing a weighting matrix for producing a weighting of the color values of the color sample space so that a smooth transition to non-selected locations in the arbitrarily shaped color space is produced at arbitrarily shaped transitions of the color space in order to avoid undesired color breaks of the color correction; and employing the weighted color values of the color samples of the color sample space for color correction of pixels of the stored color image.

2. A method according to claim 1 including the step of subjecting the color samples in the color space to a three-dimensional filtering.

3. A method according to claim 2 wherein the filtering occurs in the CIELAB color space and the filtering is established by the function $$S(L^*, a^*, b^*) = \sum_i \sum_j \sum_k a(i, j, k) P(L^* + i, a^* + j, b^* + k)$$

whereby $a(i, j, k)$ is said weighting matrix, $P(L^*, a^*, b^*)$ is a point in the color sample memory having the values 0 or 1, and the sum $S(L^*, a^*, b^*)$ is formed in the following way onto the sum of the coefficients of the weighting matrix:

$$S^*(L^*, a^*, b^*) = S(L^*, a^*, b^*)/G$$

with $$G = \sum_i \sum_j \sum_k a(i, j, k) \text{ sum of the weighting matrix}$$

4. A method according to claim 3 wherein the color correction is established by the equation $$F^*(L^*, a^*, b^*) = \{F_L^*(L^*, a^*, b^*) + S^*\Delta L^*,$$
$$F_a^*(L^*, a^*, b^*) + S^*\Delta a^*,$$
$$F_b^*(L^*, a^*, b^*) + S^*\Delta b^*\}$$

with $$F(L^*, a^*, b^*) = \{F_L^*(L^*, a^*, b^*), F_a^*(L^*, a^*, b^*), F_b^*(L^*, a^*, b^*)\}$$

F(L*, a*, b*) color values of the original color dot

F(L*, a*, b*) color values of the color-correction color dot.

5. A method according to claim 1 including the step of subjecting the color samples in the color space to a four-dimensional filtering.

6. A method according to claim 5 wherein the color space is a CMYK color space.

7. A method according to claim 1 including the step of subjecting the color samples in the color space to a n-dimensional filtering width n>4.

8. A method according to claim 7 including the step of providing the filtering in a seven-dimensional color space.

9. A method according to claim 1 including the step of processing the color values in a L*a*b* color space.

10. A method according to claim 1 including the step of providing the color values in a television standard.

11. A method according to claim 10 including the step of providing the television standard as one of the standards selected from the group consisting of NTSC, PAL, or SECAM.

12. A method according to claim 1 including the step of processing the color values in a CMYK color system.

13. A method according to claim 1 including the step of collecting the color samples in a color sample space having reduced resolution.

14. A method according to claim 1 including the step of providing the coordinate input unit as one of the units selected from the group consisting of a mouse, a keyboard, or an xy tablet.

15. A method for generating smooth color corrections in a stored color image, comprising the steps of:

selecting color samples P having locus coordinates and color values and which are collected from the stored color image with a coordinate input unit, said color samples forming an arbitrarily shaped color sample space;

providing a color computer for color correction of color values of the stored color image;

depositing color correction values K in a color correction memory and forming an arbitrarily shaped color correction space that corresponds to the color sample space;

subjecting the color correction values to a filtering with a convolution function employing a weighting matrix that generates a weighting of the color correction values before utilizing the color correction values for correction so that a smooth transition is produced at arbitrarily shaped transitions of the color correction space to non-selected locations in the color space which avoids undesired color breaks of the color correction; and employing the weighted color correction values for color correction of the stored color image.

16. A method according to claim 15 including the step of subjecting the color correction values in the color space to a three-dimensional filtering.

17. A method according to claim 11 wherein the filtering occurs in a CIELAB color space and the filtering is established by a function $$S(L^*, a^*, b^*) = \sum_i \sum_j \sum_k a(i, j, k) K(L^* + i, a^* + j, b^* + k)$$

whereby a(i, j, k) is said weighting matrix, K(L*, a*, b*) is a color correction value in the color correction space, and the sum S(L*, a*, b*) is normed in the following way onto a sum of coefficients of the weighting matrix $$S^*(L^*, a^*, b^*) = S(L^*, a^*, b^*)/G$$

with $$S(L^*, a^*, b^*) = \{S_L^*(L^*, a^*, b^*), S_a^*(L^*, a^*, b^*), S^*_{b^*}(L^*, a^*, b^*)\}$$

and $$G = \sum_i \sum_j \sum_k a(i, j, k) \text{ sum of the weighting matrix } [ijk].$$

18. A method according to claim 17 wherein the color correction is established by the equation $$F^*(L^*, a^*, b^*) = F_{L^*}(L^*, a^*, b^*) + S^*_{L^*}(L^*, a^*, b^*),$$
$$F_{a^*}(L^*, a^*, b^*) + S^*_{a^*}(L^*, a^*, b^*),$$
$$F_{b^*}(L^*, a^*, b^*) + S^*_{b^*}(L^*, a^*, b^*)\}$$

with F(L*, a*, b*) color values of the original color dot F(L*, a*, b*) color values of the color-corrected color dot.

19. A method according to claim 15 including the step of subjecting the color correction values in a color space to a four-dimensional filtering.

20. A method according to claim 19 wherein the color space comprises a CMYK color space.

21. A method according to claim 15 including the step of subjecting the color correction values in the color space to an n-dimensionl filtering with n>4.

22. A method according to claim 21 wherein the filtering occurs in a seven-dimensional color space.

23. A method according to claim 15 including the step of processing the color values in a L*a*b* color space.

24. A method according to claim 15 including the step of providing the color values in a television standard.

25. A method according to claim 24 wherein the television standard is selected from the group consisting of television standards NTSC, PAL or SECAM.

26. A method according to claim 15 including the step of processing the color values in a CMYK color system.

27. A method according to claim 15 including the step of collecting the color samples in a color sample space having reduced resolution.

28. A method according to claim 15 including the step of providing the coordinate input unit as one of the elements selected from the group consisting of a mouse, a keyboard, or an xy tablet.

* * * * *